United States Patent [19]

Akagiri et al.

[11] Patent Number: 4,685,115
[45] Date of Patent: Aug. 4, 1987

[54] APPARATUS FOR TRANSMITTING DIGITAL SIGNALS

[75] Inventors: Kenzo Akagiri, Yokohama; Masayuki Nishiguchi, Tokyo, both of Japan

[73] Assignee: Sony Corporation, Tokyo, Japan

[21] Appl. No.: 823,494

[22] PCT Filed: May 11, 1985

[86] PCT No.: PCT/JP85/00266
§ 371 Date: Jan. 13, 1986
§ 102(e) Date: Jan. 13, 1986

[87] PCT Pub. No.: WO85/05517
PCT Pub. Date: Dec. 5, 1985

[30] Foreign Application Priority Data
May 11, 1984 [JP] Japan .................. 59-94182

[51] Int. Cl.[4] ............................. H04B 14/04
[52] U.S. Cl. ........................ 375/25; 375/27; 358/135
[58] Field of Search ............ 375/25, 27, 30, 122; 358/13, 135, 136; 332/11 D

[56] References Cited
U.S. PATENT DOCUMENTS

| | | | |
|---|---|---|---|
| 3,439,753 | 4/1969 | Mounts et al. | 375/25 |
| 4,141,034 | 2/1979 | Netravali et al. | 375/27 |
| 4,453,158 | 6/1984 | Bluethgen | 375/27 |
| 4,491,953 | 1/1985 | Bellisio et al. | 358/135 |
| 4,573,167 | 2/1986 | Hentschke et al. | 375/27 |
| 4,591,909 | 5/1986 | Kuroda et al. | 375/27 |

FOREIGN PATENT DOCUMENTS

| | | |
|---|---|---|
| 53-36730 | 10/1978 | Japan . |
| 56-32651 | 7/1981 | Japan . |
| 58-162142 | 10/1983 | Japan . |
| 59-57539 | 4/1984 | Japan . |
| 59-64942 | 4/1984 | Japan . |
| 59-223032 | 12/1984 | Japan . |
| 59-223033 | 12/1984 | Japan . |
| 59-223034 | 12/1984 | Japan . |

Primary Examiner—Robert L. Griffin
Assistant Examiner—Stephen Chin
Attorney, Agent, or Firm—Hill, Van Santen, Steadman & Simpson

[57] ABSTRACT

The apparatus uses at least data in the straight PCM mode and data in the differential PCM mode of second or higher orders as data based upon a sampling value of input signals, and detects and compares maximum absolute values of data of these modes. Here, the apparatus so compares that the maximum absolute value of the differential PCM mode is more weighted than the maximum absolute value of the straight PCM mode, selects the mode having the smaller maximum absolute value, and transmits the data of the selected mode in the form of digital signals. This makes it possible to suppress low-pass noise when medium-pass signals are input, to advantageously utilize the masking effect, to reduce the effect of code error, and to improve apparent SN ratio.

4 Claims, 9 Drawing Figures

APPARATUS FOR TRANSMITTING DIGITAL SIGNALS

TECHNICAL FIELD

This invention relates to an apparatus for transmitting digital signals such as PCM signals and, more particularly, to an apparatus for transmitting digital signals whereby the noise may be lowered.

BACKGROUND ART

With the recent progress in the digital technology, analog signals such as audio or video signals are frequently subjected to sampling, quantization and encoding for transmission, recording or reproduction in the form of what is called pulse code modulated signals (PCM signals).

In converting and transmitting analog signals into and as PCM digital signals, it is well known that the bandwidth of the transmissible analog signals becomes broader with increase in the sampling frequency whereas the dynamic range becomes broader with increase in the number of quantizing bits. Hence, when it is desired to perform digital transmission of the original analog signals with high fidelity, that is, with a wide band and a large dynamic range, a higher frequency and a larger number of quantization bits are required, with the result that the number of bits transmitted per unit time or what is called the bit rate is increased.

However, the properties of the transmission medium inclusive of the recording medium and those of the digital signal processing speed at the transmission and reception sides (recording and reproducing sides) result in limitations on the bit rate. As a matter of fact, from the economic considerations and in view of the cost performance of the PCM signal recording and/or reproducing apparatus, it is imperative to make high quality signal transmission, recording or reproduction with as low a bit rate as possible.

Such differential PCM system or additive PCM system is known in the art as the technology for transmitting signals with large dynamic range at a relatively low bit rate. These systems are subject to error propagation. When it is desired to provide for some error corrective capacity, there results an increase in redundancy so that the effect of bit rate reduction is lowered.

The present inventors have devised, in the Japanese Patent Application No. 97687/1983, a blockwise digital signal transmission method wherein plural words of the differential PCM mode data compose one block, and at least one sampled value data word is arranged in each block. Owing to the presence of the sampled data word even when an error is introduced into the differential or additive PCM data, error propagation is confined within the extent of the block so that error propagation is allowed to continue for only a limited time interval.

The present inventors have also devised in the Japanese Patent Application No. 97688/1983 a digital signal transmission system wherein the one mode of a maximum data compression ratio per each block from the normal PCM mode (straight PCM mode), the differential PCM mode and the additive PCM mode is selected and the data of each block is sequentially transmitted with the selected mode, so that the occasionally maximum transmission efficiency may be obtained per each block for achieving signal transmission, recording or reproduction with a low bit rate and a high quality.

The present inventors have also devised a digital signal transmission system, in the Japanese Patent Application No. 97689/1983 wherein the noise spectrum which depends on frequency spectrum of the input signal is obtained by the noise shaping in the best use of what is called the masking effect, so as to reduce the apparent noise.

According to the Japanese Patent Application No. 97689/1983, the maximum absolute values of, for example, the differential PCM data and the normal or straight PCM data, are compared to each other, the mode with the occasionally lesser value is selected, and the error feedback value at the time of the noise shaping process is switched as a function of mode selection so as to control the noise spectrum. Assuming that the input signal is a sinusoidal wave, the frequency $f_T$ at which the switching takes place between the differential and straight PCM modes is one-sixth of the sampling frequency $f_s(f_T=f_s/6)$. For example, $f_T=5.3$ kHz for $f_s=32$ kHz. That is, the differential PCM mode is selected for the input signal frequency up to ca. 5.3 kHz, and the straight PCM noise is selected for the higher frequency.

In the apparatus shown in the Japanese Patent Application No. 97689/1983, it has been found that the low frequency noise becomes more audible when the differential PCM mode is selected for an input signal of the mid range frequency slightly lower than the above defined frequency $f_T$.

This is because the low frequency noise becomes difficult to mask when the frequency of the input signal is in the mid range, and also because the noise energy of the differential PCM mode is increased with rise in the frequency of the input signal. It has also been found that the noise due to coding error is also increased for the input signal as the above.

It is therefore an object of the present invention to provide an apparatus for transmitting digital signal wherein the low frequency noise can be suppressed for the mid range frequency of the input signal so that the masking effect, and works more efficiently the apparent noise and the noise due to coding error may be reduced.

DISCLOSURE OF THE INVENTION

According to the present invention, in an apparatus for transmitting a digital signal wherein the data based on the sample value of the input signal is digitized and transmitted, the improvement comprises means for outputting on the basis of said sample value, at least one straight PCM data and differential PCM data prepared from two or more straight PCM data, and means for detecting the occasionally maximum absolute values of the respective modes supplied from the data output means, multiplying at least one of the maximum absolute values of the respective modes with a coefficient so that the weight factor associated with the maximum absolute value of the straight PCM mode is less than that of the differential PCM mode, comparing the resulting values to one another, and selecting the mode with less maximum absolute value, so that the PCM data selected as the above is then transmitted, thereby the low frequency noise is reduced to make the best use of the masking effect when the input signal of the mid frequency range is supplied and the influence of coding error is also reduced to improve the apparent S/N ratio.

BEST MODE FOR CARRYING OUT THE INVENTION

Figure 1:
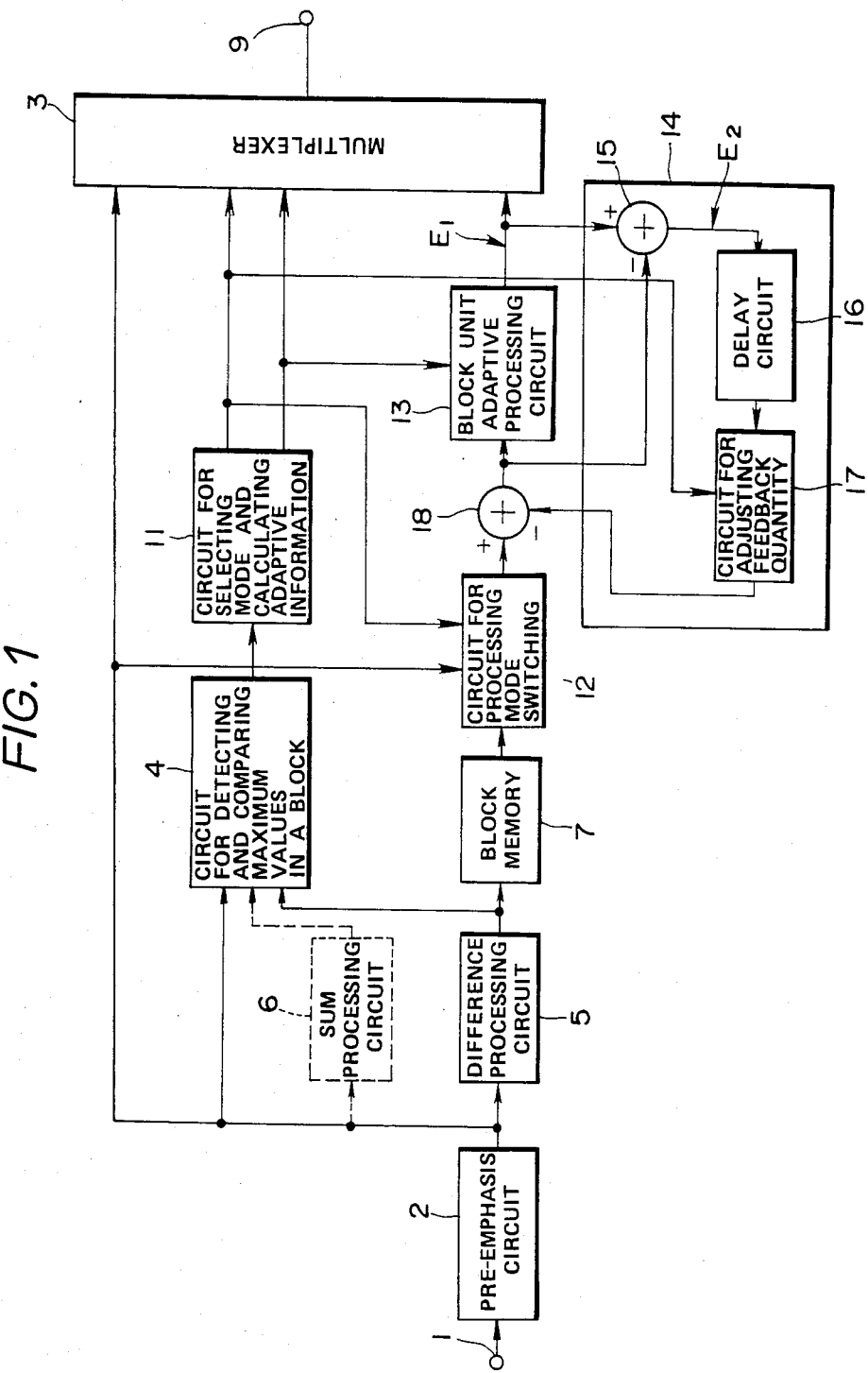
FIG. 1 is a block circuit diagram showing an encoder used in an embodiment of the present invention.

As an example of the apparatus for transmitting digital signal according to the present invention, the encoder and the decoder employed in the bit rate reduction system for audio signal are hereafter explained by referring to the drawings.

FIG. 1 is a block diagram showing the encoder of the bit rate reduction system for audio signal. In this figure, digital PCM signal (sampled value data signal), of 14-bit for example, is supplied to an input terminal 1 of the encoder. To the input terminal 1 is connected a preemphasis circuit 2 which is employed for increasing the magnitude of the signal in the high frequency range so as to improve the S/N ratio. For example, the circuit 2 may have a time constant equal to 50 $\mu$s or $-15$ $\mu$s. The output signals of 14-bit, for example, supplied from the preemphasis circuit 2 is supplied to a multiplexer 3, a circuit 4 for detecting and comparing the maximum value within a block, and a difference processing circuit 5, respectively. The circuit 4 is supplied with, in addition to the sampling data signal of 14-bit from the preemphasis circuit 2, a difference data signal of 15-bit, for example, which is derived from the difference processing circuit 5.

Every n of PCM data of the sampled value supplied to the input terminal 1 (hereafter referred to as straight PCM data) compose one block. In the difference processing circuit 5, n−1 differential PCM data $d_1$ to $d_{n-1}$ may be obtained as follows:

$$d_1 = x_1 - k \cdot x_0$$

$$d_2 = x_2 - k \cdot x_1$$

...

...

$$d_{n-1} = x_{n-1} - k \cdot x_{n-2}$$

wherein $x_0, x_2, \ldots, x_{n-1}$, represent the straight PCM data in a given block and k represents a prediction coefficient. It is note that the sampled value data $x_0$ at the head of the block is directly supplied as a reference word $W_0$ to the multiplexer 3.

Figure 2:
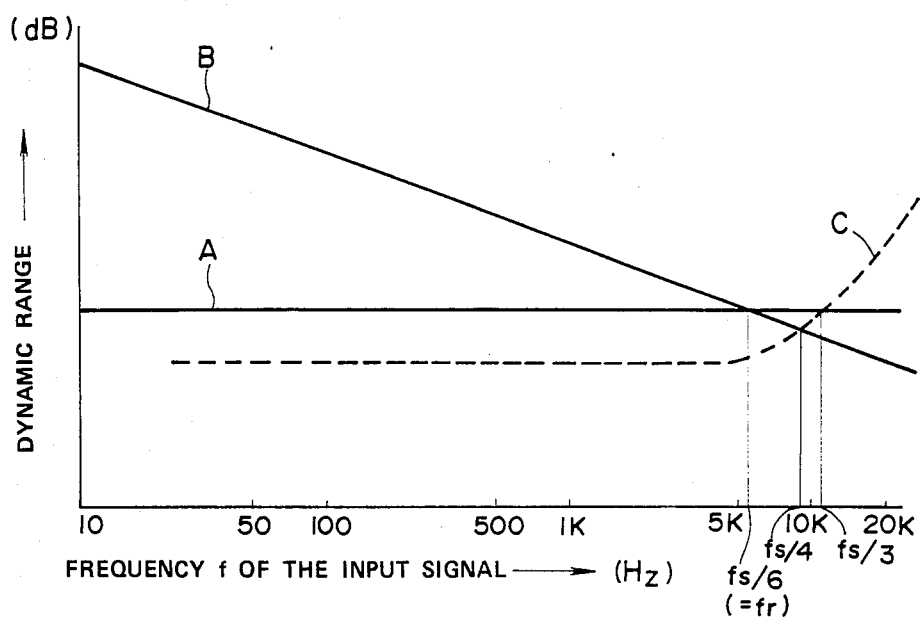
FIG. 2 is a graph showing the frequency response of the dynamic range in the respective PCM modes.

It is also noted that, when the number of bits in the differential PCM data is fixed, as described in the Japanese Patent Application No. 97688/1983, the dynamic range is changed with the frequency of the input signal. Namely, FIG. 2 shows the dynamic range for the case in which the input signal is sampled with a predetermined sampling frequency and quantized with a predetermined number of bits so as to obtain the aforementioned straight PCM data and the first-order differential PCM data. It will be seen that the characteristics A for the straight PCM mode are not dependent upon the frequency, f of the input signal, whereas in the characteristics B for the first-order differential PCM mode, the dynamic range is increased with decrease in the frequency f of the input signal. Also dynamic range for the first-order differential PCM mode becomes equal to that for the straight PCM mode, when the frequency f of the input signal is equal to one-sixth of the sampling frequency $f_s$. With the frequency equal to $f_s/6$, the maximum absolute value of the straight PCM data becomes equal to the maximum absolute value of the first-order differential PCM data. Thus, by selecting the first-order differential PCM mode for the input signal of the frequency less than $f_s/6$ and selecting the straight PCM mode for the input signal of the frequency higher than $f_s/6$, the dynamic range can be increased with a high compression effeiciency. In the example of FIG. 2, the sampling frequency $f_s$ is set to 32 kHz.

The circuit 4 shown in FIG. 1 for detecting and comparing the maximum value in a block is employed for selecting the mode of higher compression efficiency for each block. In the circuit 4, the maximum absolute value among the straight PCM data $x_1$ to $x_{n-1}$ in one block is compared with the maximum absolute value among the differential PCM data $d_1$ to $d_{n-1}$ for selecting the mode with less maximum absolute value. According to the present invention, at least one of the maximum absolute values for the respective modes is multiplied by a coefficient to provide with a differential in weighting. Thus, the weight factor applied to the maximum absolute value for the straight PCM mode is made smaller than the weight factor applied to the maximum absolute value for the differential PCM mode. Hence, the straight PCM mode is selected even when the frequency of the input signal is the midrange and slightly lower than the frequency $f_T$ at which the switching between the differential and straight PCM modes takes place in the previous system. In other words, the frequency $f_T'$ of the input signal at which switching between the differential and straight PCM modes takes place in the present invention is set to less than the frequency $f_T$ in the previous system ($f_T' < f_T$).

A circuit 11 for selecting and mode and calculating adaptive information is used for outputting the information concerning the selected mode and the information concerning adaptive processing in a block unit. The mode selecting information or data is supplied to a circuit 12 for processing mode switching and the multiplexer 3, whereas the adaptive information is supplied to an adaptive processing circuit 13 for re-quantizing and the multiplexer 3. The circuit 12 for processing mode switching outputs the each word data of the selected mode of one block, that is, the n−1 data $x_1$ to $x_{n-1}$ when the straight PCM mode is selected, and the n−1 data $d_1$ to $d_{n-1}$ when the differential PCM mode is selected. The input signal to the circuit 12 for processing mode switching is the differential PCM data $d_1$ to $d_{n-1}$ of one block supplied from the difference processing circuit 5 and stored in a block memory 7. The circuit 12 output the input data as such, when the differential PCM mode is selected, while it performs an following operation on the basis of the differential PCM data so as to output the straight PCM data $x_1$ to $x_{n-1}$, when the straight PCM mode is selected.

$$x_1 = d_1 + k \cdot x_0$$

$$x_2 = d_2 + k \cdot x_1$$

...

...

$$x_{n-1} = d_{n-1} + k \cdot x_{n-2}$$

It is noted that, in addition to the block memory 7 for storing of the differential PCM data, another block memory may be provided for storing of the straight PCM data from the preemphasis circuit 2. In this case, the straight PCM data from the another block memory or the differential PCM data from the block memory 7 may be alternately outputted as a function of the selected mode.

A block unit adaptive processing circuit 13 operates to re-quantize the word data within one block from the circuit 12 for processing mode switching with as quantizing step width corresponding to the above described maximum absolute value in each block into for example 7-bit-per-word data, so as to provide the multiplexer 3 with these re-quantized data. The data to be re-quantized in this manner are the n−1 word data $x_1$ to $x_{n-1}$ or $d_1$ to $d_{n-1}$ per block which are 14 or 15-bit per word, while the data is subjected to block floating with the use of, for example, 7 bits in the mantissa part and 3 bits in the index part, so as to provide a bit reduction high-efficiency. The block floating is performed in such a manner that the whole words in one block are subjected to bit shifting by, for example, m bits corresponding to normalizing the aforementioned maximum absolute value in each block. At this time, the bit shift number m indicated as in the binary form as the three-bit index number, that is, as the range or adaptive information and the upper seven bits of each word thus subjected to bit shifting as the mantissa part are taken. As an altervative, non-linear quantization may be used for performing the above described requantization. The above described block unit adaptive processing is also called the semi-instantaneous block unit compressive operation.

The reference words $W_0$ directly supplied from the preemphasis circuit 2, the mode selecting information word M and adaptive or range information word R from the circuit 11 for selecting mode and calculating adaptive information and 7-bit words taken as the aforementioned mantissa part from the block unit adaptive processing circuit 13 are combined in the multiplexer 3 as one block so as to be converted into serial data which is transmitted via output terminal 9.

Figure 3:
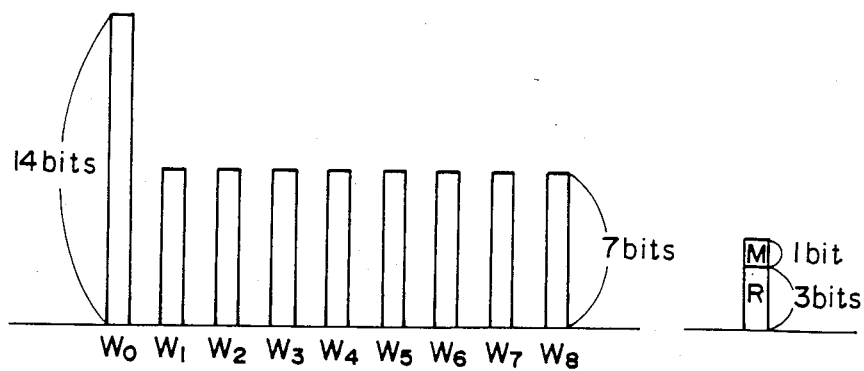
FIG. 3 is a diagram showing a word set example of a transmission block.

For explanation of the contents of data in one block supplied to the multiplexer 3, the example code structure of one block for the block length n equal to 9 is shown in FIG. 3. In this figure, the head word $W_0$ in the block is the aforementioned reference word which employs the straight PCM data $x_o$ of 14-bits as it is. Each of the eight words $W_1$ to $W_8$ following the reference word $W_0$ is a mantissa part data of 7-bit-per-word resulting from the re-quantization. The index part word R (range or adaptive information word) is used in common to these words $W_1$ to $W_8$. The word R is a 3-bit word, for example, and denotes the bit shift number to normalize the maximum absolute value in the block. The mode selecting information word M is also provided in one block. In case that one of the two modes, that is, the differential PCM mode and the straight PCM mode is selected as in the present embodiment, the mode selecting information word M may comprise 1-bit. Eventually, for the 9-word samples transmitted as one block, the total number of bits is equal to 74, and the mean word length is approximately 8.2 bits. That is, the PCM data comprised of 14-words can be transmitted with the mean word length about equal to 8.2 bits.

Referring to FIG. 1, there is provided an error feedback circuit 14 for processing the noise shaping in association with the adaptive processing circuit 13. In the operation of the error feedback circuit 14, the error caused between the input and the output of the adaptive processing circuit 13 is taken at adder 15 to subtract therebetween and delayed by a delay circuit 16 by, for example, one sampling period. The delayed error signal is then reduced by predetermined value by a circuit 17 for adjusting feedback quarity so as to be fed back by way of an adder 18 to subtract provided to the input side of the adaptive processing circuit 13. Such error feedback makes it possible to change the spectrum pattern of the requantization noise.

Figure 4:
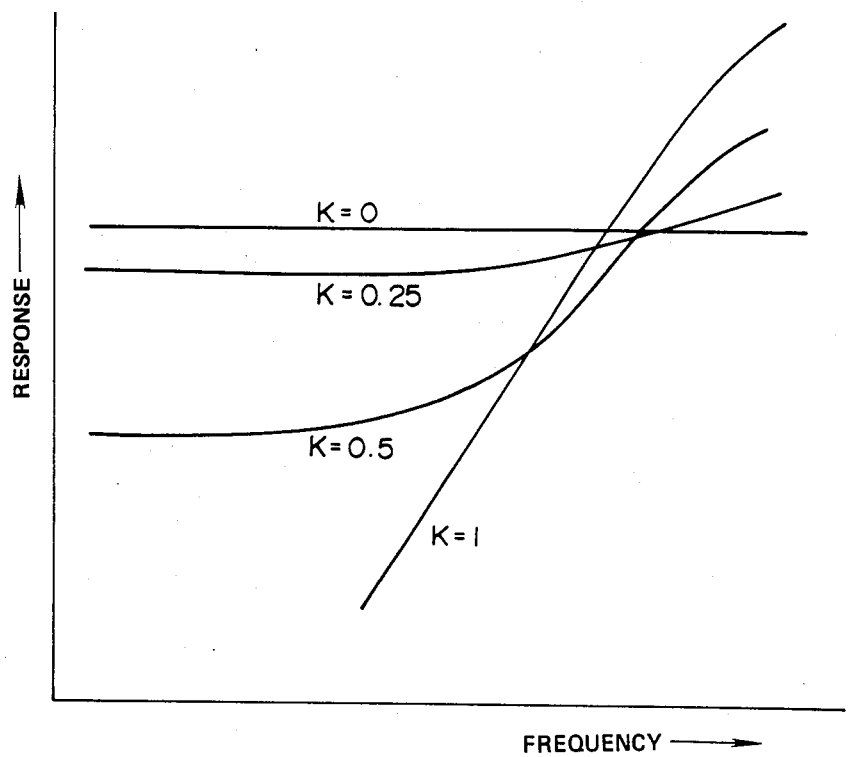
FIG. 4 is a graph showing the properties of the noise shaping by the error feedback.
Figure 5:
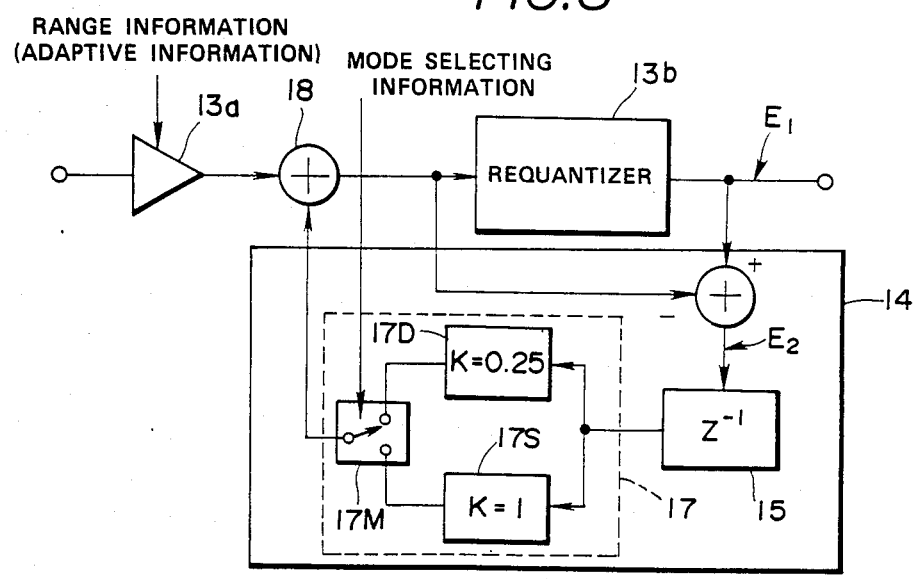
FIG. 5 is a block circuit diagram showing a practical example of the error feedback circuit.

Rerationship between the signal $E_1$ supplied from the adaptive processing circuit 13 to the adder 15 and the error signal $E_2$ supplied from the adder 15, is indicated in the Japanese Patent Application No. 97689/1983 as a following equation equation $$|E_1(f)| = \left(1 + K^2 - 2K \cos 2\pi \frac{f}{f_s}\right)^{\frac{1}{2}} \cdot |E_2(f)|$$

where K represents a reducing coefficient in the circuit 17 for adjusting feedback quantity and $f_2$ represents the sampling frequency. The frequency response resulting from changing the value of K in the above equation is shown in FIG. 4. Thus such noise shaping operation may be obtained that the noise spectrum is concentrated to the higher frequency side as the value of K approaches closer to 1. In the present embodiment, the error feedback coefficient K is equal to 1, when the straight PCM mode is selected and equal to 0.25 for when the differential PCM mode is selected. The switching of the error feedback coefficient K in dependence upon the selected mode is achieved by using a circuit 17 for adjusting feedback quantity in which a coefficient multiplier 17S with K=1 and another coefficient multiplier 17D with K=0.25 is selected by a changeover switch 17M as a function of the aforementioned mode selecting information, as shown for example in FIG. 5. As an alternative, a variable coefficient multiplier may be provided in the circuit 17 for adjusting feedback quantity to directly control the coefficient value. In the embodiment shown in FIG. 5, the block unit adaptive processing circuit 13 is comprised of a shifter (bit shifting circuit) 13a and a requantizer 13b, between which adder 18 is interconnected.

Figure 6A:
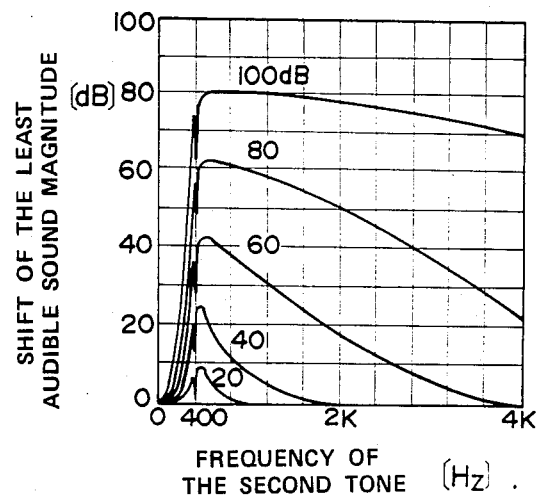
FIGS. 6A and 6B are graphs showing the masking effect of a pure tone by another pure tone.
Figure 6B:
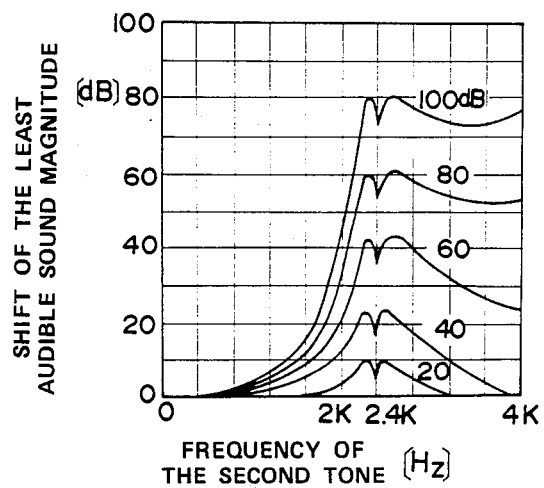

It is in consideration of what is called the masking effect that the noise spectrum is changed in dependence upon the selected mode as described above. That is, FIGS. 6A and 6B are graphic charts showing the characteristics of the masking effect of a pure tone by another pure tone. In these figures, the shift of the least audible sound magnitude (in dB) is plotted on the vertical axis and the frequency of the second tone (in Hz) is plotted on the horizontal axis. FIGS. 6A and 6B show the cases wherein the first tone is the 400-Hz and the 2400-Hz, respectively. The numerical values (in dB) entered in the vicinity of the characteristic curves indicate the sensory level of the first tone. It may be seen from FIGS. 6A and 6B that a notable masking effect may be achieved when the frequency of the first tone is close to that of the second tone.

Hence, by effecting a noise shaping, for example, in such a manner that the major portion of the input signal spectrum will be coincident with the major portion of the noise spectrum, a large masking effect is achieved with an resultingly improved S/N ratio so for as the auditory sense is concerned. In effect, in the straight PCM mode which is selected for the input signal of high frequency, the error feedback quantity is increased, so that the noise spectrum will become larger in high frequency side. In the differential PCM mode, which is selected for the input signal of the mid to low frequency range, the error feedback quantity is lowered, so that the frequency response resulting from the noise shaping becomes flat and noise at the low frequency range becomes larger as total characteristics with the frequency response (curve B in FIG. 2) of the dynamic range proper to the differential PCM, for making the best use of the masking effect. A small feedback quantity (K=0.25) is used during the differential PCM mode operation in order that the noise spectrum will become more continuous to provide for a more agreeable hearing feeling.

However, the low frequency noise undesirably becomes more audible if the differential PCM mode is selected when the input signal of the mid frequency range at a slightly lower frequency than the conventional mode switching frequency $f_T(=f_s/6)$ at which the dynamic range for the differential PCM mode and that of the straight PCM mode are equal to each other. One reason for this is that, as will be seen from the characteristic curves of masking effect in FIG. 6 changing non-symmetrically at the low frequency and high frequency sides, since the noise components of the lower frequency than the frequency of the input signal are less likely to be masked, whereas those of the higher frequency than the frequency of the input signal are more likely to be masked, when the differential PCM mode is selected for the input signal of the mid frequency range, the noise at low frequency range is not masked effectively. Another reason is that the noise energy is increased with increase the frequency of the input signal during the differential PCM mode operation. In addition, during the differential PCM mode operation, the output of the differential PCM is increased with increase in the frequency of the input signal and the range operation is more unlikely to take place so that the influence of the coding error will become more manifest.

Thus, in accordance with the present invention, at least one of the maximum absolute values of the respective modes in the each block is multiplied by a factor or coefficient so that the weighting applied to the maximum absolute value of the differential PCM data will be larger than that of the straight PCM data. These weighted maximum absolute values of the respective modes are compared with each other so that the mode with the less maximum absolute value is selected. In this case, the straight PCM mode is selected even when the input signal of mid range frequency slightly lower than the frequency $f_T$ is supplied so that the actual frequency $f_T'$ for mode switching is lower than the aforementioned frequency $f_T(f_T' < f_T)$. The result is that the reduction effect of the low frequency noise proper to the straight PCM mode and the coding error characteristics free from error propagation are obtained when the input signal of the mid frequency range are supplied. It will be noted that, although the noise appear predominantly in the high frequency side in the straight PCM mode, no are presented in hearing sense, since the a larger masking effect an be achived at the higher frequency side as will be seen from the characteristic curve shown in FIG. 6B.

Figure 7:
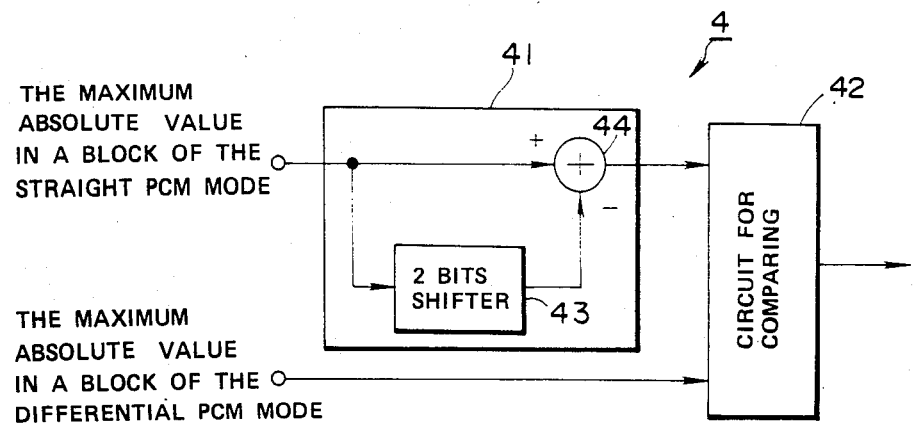
FIG. 7 is a block circuit diagram showing an example of the circuit for detecting and comparing the maximum values in the blocks.

For comparison of the weighted maximum absolute values of the respective modes, when the maximum absolute value of the differential PCM mode is directly used as it is, that is, when the multiplying coefficient is equal to 1, a positive figure less than 1 may be used as the multiplying coefficient to be applied to the maximum value of the straight PCM mode. In effect, for example with the sampling frequency $f_s$ equal to 32 kHz, the error feedback coefficient K for the sampling frequency $f_s$ equal to 0.25, and the error feedback coefficient K for the straight PCM mode equal to 1, the multiplying coefficient or weight to be applied to the maximum absolute value of the straight PCM mode in a block is suitably set to 0.75. The practical structure for comparing such weights may comprises a coefficient multiplier 41 as shown in FIG. 7 in the circuit 4 for detecting and comparing maximum value in a block shown in FIG. 1 so as to multiply the maximum absolute value of the straight PCM mode in a block with the aforementioned coefficient of 0.75. The resulting product is supplied to a comparising circuit 42 so as to compare with the maximum absolute value in the block for the differential PCM mode. The coefficient multiplier 41 shown in FIG. 7 is so constructed that the output from the shifter 43 which is designed to shift the input data by two bits is coupled to an adder 44 so as to substract from the original input data. Since the input data is multiplied by $\frac{1}{4}(=0.25)$ by the shifter 43, the data which is 0.75(=1−0.25) times of the input data is obtained from the adder 44.

It is noted that, when the maximum absolute value in the straight PCM mode is used as it is, that is, with the multipication coefficient equal to 1, the maximum absolute value in the differential PCM mode may be multiplied by a coefficient larger than 1, for example, 4/3, for comparison.

Figure 8:
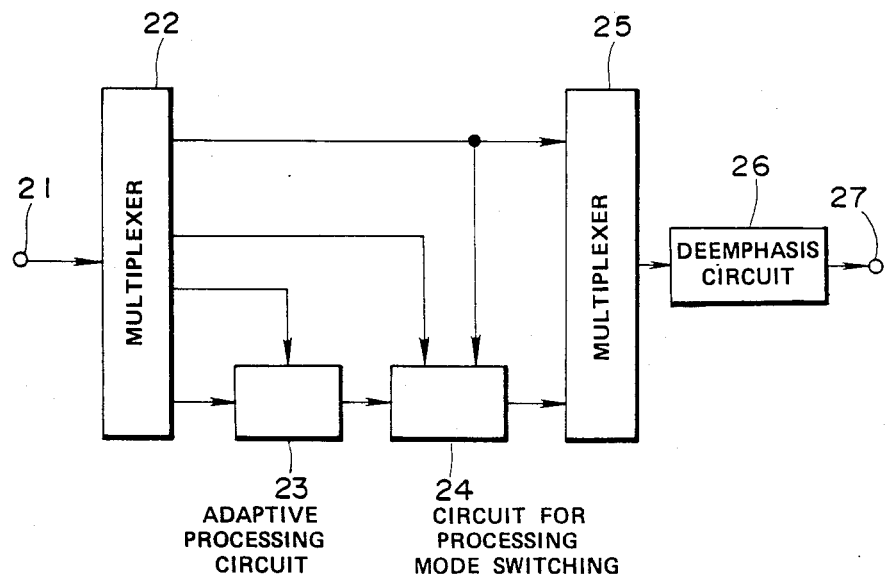
FIG. 8 is a block circuit diagram showing an example of the decoder performing the reverse operation against the operation of the encoder shown in FIG. 1.

The digital signal outputted and transmitted or occasionally recorded and reproduced at the terminal 9 of the multiplexer 3 shown in FIG. 1 is decoded into the original sampled value signal by a decoder shown, for example, in FIG. 8.

In the FIG. 8, the transmitted digital signal is supplied to a multiplexer 22 by way of an input terminal 21. The multiplexer 22 separate the words $W_0$, $W_1$ to $W_{n-1}$, M and R of FIG. 3 from one another on the basis of the block synchronizing signal or word synchronizing signals in the transmitted digital signal and transmit adaptively processed data words $W_1$ to $W_{n-1}$ to a back-adaptive processing circuit 23. The processing circuit 23 decodes a adaptive processing on the basis of the contents of the adaptive or range information word R from the multiplexer 22. For example, m bits are added to the higher order side of the MSB (sign bit) of each of the words $W_1$ to $W_{n-1}$ of 7-bits to provide m+7 bits. Then, 8−m invalid bits are added to the lower order side of the LSB of each of the words of 7-bits to provide a 2' complement data of totally 15-bit. The 15-bit data is the data of the mode indicated by the mode selecting word M so as to be the data $x_1$ to $x_{n-1}$ when the straight PCM mode is selected and the data $d_1$ to $d_{n-1}$ when the differential PCM mode is selected. The data from the adaptive processing circuit 23 is supplied to the circuit 24 for processing mode switching where the data are processed in accordance with the contents of the mode selecting word M so as to be supplied to the multiplexer 25 in the form of the above described sampled value data $x_1$ to $x_{n-1}$. In the operation of the circuit 24 for processing mode switching, when the input data is the straight PCM data $x_1$ to $x_{n-1}$, the input data is supplied to the multiplexer 25 as it is, when the input data is the differential PCM data $d_1$ to $d_{n-1}$, it is converted into data $x_1$ to $x_{n-1}$ by the summing operation. During this summing operation, the instantaneous sampled value data $W_0(=x_0)$ is also used.

In the operation of the multiplexer 25, the instantaneous sampled value data $W_0(x_0)$ from the multiplexer 22 in the input stage and the sampled value data $x_1$ to $x_{n-1}$ from the circuit 24 is for processing mode switching outputted word by word, for example, at the sampling period, for sequentially outputting the data of n-word $x_0$ to $x_{n-1}$ per block. The output signal from the multiplexer 25 is taken at the output terminal 27 by way of a deemphasis circuit 26 whose characteristics are the reverse of those of the preemphasis circuit 2.

In the above described embodiment of the present invention, for improving the situation in the prior art in which the noise of low frequency become undesirably outstanding as a result of selection of the differential PCM mode when the input signal of the mid frequency range is supplied the noise shaping is performed in such a manner as to shift the noise towards a higher frequency range through the selection of the straight PCM mode. Accordingly, in the straight PCM mode, by utilizing the fact that the masking effect becomes more apparent at the higher frequency side of the input signals and that the noise energy of the mid to low frequency range is lowered as compared with that of the differential PCM mode the audible noise is markedly reduced, while the sound quality is improved simultaneously.

Also, in accordance with the present embodiment, plural words of the data to be transmitted are arranged into the block in such a manner that the error propagation in the differential PCM mode can be terminated in a short time, the prediction coefficient k for the differential and additive operations can be selected to a higher value to provide for a more effective adaptive operation, thus making possible transmission of the adaptive differential PCM digital signals with a wide dynamic range. Since the adaptive information can be transmitted at the rate of one word per block, the bit rate may be lowered as compared to the case of transmitting adaptive information per word of each PCM data. The error corrective capability may also be elevated notably without drastic increase in redundancy.

In addition, in accordance with the above described embodiment of the present invention, the maximum value of words in the various transmission modes in a block such as straight PCM or differential PCM modes are compared to one another in order to select the mode providing for the maximum compression, and the data of the selected mode is transmitted m block units, with the result that the adverse effects such as error propagation, deterioration in the instantaneous S/N ratio or increased distortion factor can be minimized to provide for digial signal transmission with a high transmission efficiency.

The present invention is not limited to the above embodiment. For example, an additive PCM may be selectable in addition to the above described straight and first-order differential PCM modes. In this case, the construction shown in FIG. 1 is provided with an additive processing circuit 6, wherein additive PCM data of $n-1$ word $a_1$ to $a_{n-1}$ are obtained as follows on the basis of the sampled value data $x_0$ to $x_{n-1}$ of one block.

$$a_1 = x_1 + k \cdot x_0$$

$$a_2 = x_2 + k \cdot x_1$$

$$\cdots$$

$$\cdots$$

$$a_{n-1} = x_{n-1} + k \cdot x_{n-2}$$

The maximum absolute value of these additive PCM data $a_1$ to $a_{n-1}$ in each block is compared with the maximum absolute values of the other mode blocks so as to select the mode having the least maximum value. For comparison, the weight factors applied to straight and additional PCM modes may be set to be equal to each other, whereas the weight factor applied to the differential PCM mode may be larger than the first stated weight factors. Since the dynamic range response to the input frequency in the case of the additive PCM mode becomes higher towards the higher frequency side as indicated by the characteristic curve C shown in FIG. 2, the straight PCM mode and the additive PCM mode are switched at the frequency $f_s/3$ at which the dynamic range for the additive PCM mode is equal to that for the straight PCM mode. It will be noted that, in the decoder of FIG. 8, the original data $x_1$ to $x_{n-1}$ can be restored by differentially processing the additive PCM data $a_1$ to $a_{n-1}$ and the data $x_0$ of the reference word $W_0$.

We claim:

1. An apparatus for transmitting a digital signal comprising:
   means for receiving an input digital signal including digital words each representing a sample value;
   means for outputting at least one straight pulse code modulated data word of a first mode and a differential pulse code modulated data word of a second mode, each of said differential data words being produced from two or more of said straight data words;
   means for obtaining absolute values of the words of said first and second modes and for detecting respective words having maximum absolute values in the respective modes;
   means for multiplying at least one of said maximum absolute values by a predetermined scale factor coefficient so that the weight coefficient associated with said maximum absolute value in said first mode is less than that associated with said maximum absolute value in said second mode to produce multiplied maximum absolute values;
   means for comparing said multiplied maximum absolute values with one another;
   mode selecting means for selecting one of said modes having the lesser of said multiplied maximum absolute values; and
   transmitting means for transmitting a digital signal including words of the selected mode.

2. An apparatus according to claim 1, further comprising means for changing a noise spectrum in dependence upon said selected mode, wherein said transmitting means transmits said digital signal through said means for changing said noise spectrum.

3. An apparatus according to claim 1, wherein said means for outputting provides additive pulse code modulated data words of a third mode, said additive data words being produced from two or more of said data words.

4. An apparatus according to claim 1, further comprising pre-emphasis means for preemphasizing said input digital signal, signal preemphasis means being connected between said means for receiving and said means for outputting.

* * * * *